United States Patent [19]
Nighan et al.

[11] Patent Number: 5,907,570
[45] Date of Patent: May 25, 1999

[54] DIODE PUMPED LASER USING GAIN MEDIUMS WITH STRONG THERMAL FOCUSSING

[75] Inventors: William L. Nighan, Menlo Park; Mark S. Keirstead, San Jose; Emily Cheng, Sunnyvale, all of Calif.

[73] Assignee: Spectra-Physics, Inc., Mountain View, Calif.

[21] Appl. No.: 08/955,768

[22] Filed: Oct. 22, 1997

[51] Int. Cl.⁶ ............................................. H01S 3/16
[52] U.S. Cl. ........................ 372/41; 372/10; 372/75; 372/103; 372/105; 372/106
[58] Field of Search ..................... 372/75, 92, 98, 372/106, 41, 103, 10, 19, 105

[56] References Cited

U.S. PATENT DOCUMENTS

| | | | |
|---|---|---|---|
| 5,410,559 | 4/1995 | Nighan, Jr. et al. | 372/41 |
| 5,412,683 | 5/1995 | Nighan, Jr. et al. | 372/75 |
| 5,561,547 | 10/1996 | Keirstead et al. | 372/41 |
| 5,638,397 | 6/1997 | Nighan, Jr. et al. | 372/92 |
| 5,651,020 | 7/1997 | Nighan, Jr. et al. | 372/92 |

*Primary Examiner*—James W. Davie
*Attorney, Agent, or Firm*—Wilson Sonsini Goodrich & Rosati

[57] ABSTRACT

A diode pumped laser includes a resonator mirror and an output coupler, defining a laser resonator with a resonator optical axis. A strong thermal lens gain medium with a $TEM_{00}$ mode diameter is mounted in the resonator along the resonator optical axis. The dopant level of the gain medium is in the range of 0.01 to less than 0.5 percent. A diode pump source supplies a pump beam to the gain medium in the laser resonator, and produces an output beam with a diameter larger than the $TEM_{00}$ mode diameter to reduce thermal birefringence. A power source supplies power to the diode pump source. A polarizing element can be positioned in the resonator, along with a aperture stop The laser operates well over a large range of pump powers. Its slope efficiency in the $TEM_{00}$ mode is greater than 40%, with an overall efficiency greater than 25%. One of the gain mediums used is $Nd:YVO_4$. This material exhibits high gain and a short upper state lifetime. These properties make it attractive in designing a Q-switched laser, or one that is insensitive to optical feedback. Another material is Nd:YAG. The technique of optimizing the pump beam spot size is found to minimize loss due to thermal birefringence.

34 Claims, 6 Drawing Sheets

DIODE PUMPED LASER USING GAIN MEDIUMS WITH STRONG THERMAL FOCUSSING

CROSS-REFERENCE TO RELATED APPLICATIONS

This application is related to U.S. patent application Ser. No. 08/432,301 filed May 1, 1995 (U.S. Pat. No. 5,651,020) which is a continuation-in-part of U.S. patent application Ser. No. 08/191,772 filed Feb. 4, 1994 (U.S. Pat. No. 5,412,683), both assigned to the assignee of the instant application, and incorporated herein by reference.

BACKGROUND OF THE INVENTION

1. Field of the Invention

This invention relates generally to diode pumped lasers, and more particularly to lasers that use a diode source to pump a gain medium that provides a strong thermal lens.

2. Description of Related Art

Diode lasers, either as single spatial mode diodes, diode arrays, or diode bars, have been utilized to pump a variety of gain mediums. Early work by Baer et al. determined that the efficiencies of array-pumped lasers are greatly enhanced by an end-pumped design that focusses the multimode diode pump light to a diameter in the gain medium that is smaller than the $TEM_{00}$ mode diameter. It is also important that the absorption length of the diode pump light in the gain medium is sufficiently short to confine most of the multimode diode pump light to within the $TEM_{00}$ mode volume. See for example, U.S. Pat. Nos. 4,653,056 and 4,656,635. This classic invention has been called "mode-matching".

The effect of mode-matching is to maximize the coupling between the $TEM_{00}$ mode of the laser resonator and the excited volume in the gain medium within the resonator. In turn, the optical slope efficiency and the overall optical efficiency are both maximized for a given pump source. In a classic mode-matched geometry, the ratio R of the $TEM_{00}$ mode diameter to the pump beam diameter in a diode-end-pumped Nd:YAG laser is usually greater than 1, for example 1.3. This is typically accomplished in a longitudinally-pumped or end-pumped configuration, where the propagation direction of the diode pump beam is nominally parallel to that of the eigenmode within the gain medium of the diode-pumped laser. At lower diode pump powers, such as 2 W, mode-matching has proven to be very successful in achieving the required efficiencies and in producing gaussian beams that are very nearly diffraction limited. Typically, at these pump powers and with the typical pump spot sizes that are used in end-pumped lasers that utilize diode arrays, thermal focussing, lensing, or thermal aberrations are not significant enough to degrade the efficiency of the end-pumped, mode-matched system. It is also known in the art that the exact shape of the pump light distribution does not matter in these mode-matched, low power systems. The multimode, lobed pattern from a diode array still induces $TEM_{00}$ operation if end-pumping an Nd:YAG laser in a mode-matched configuration.

At low pump powers, longitudinal mode-matching techniques work well both for materials with strong thermal focussing characteristics (like Nd:YAG and Nd:YVO$_4$), and for materials with weak thermal focussing characteristics (like Nd:YLF). This is because pump powers below about 2 W with typical pump spot sizes result in pump power densities that are typically too low to induce a thermal lens of a magnitude that could significantly alter the properties of a typical diode-pumped laser resonator. These power levels are available from diode arrays. Recently, higher power arrays have become available (~4 W, for example, from Spectra-Diode Labs). At still higher pump powers, such as those available from 10 and 20 W diode laser bars, thermal effects become significant in end-pumped lasers, and must be taken into account. Still, end-pumping remains attractive because of the potential of a highly efficient diode-pumped laser system.

At the higher pump powers of diode bars, thermal lenses of appreciable focussing power can be generated in the gain medium by the diode pump light, especially when longitudinal pumping is employed. The aberrations that are inherently associated with these strong thermal lenses are thought to limit the efficiency of high power diode-pumped lasers. See for example S. C. Tidwell, J. F. Seamans, M. S. Bowers, A. K. Cousins, IEEE J. Quantum Electron. 24, 997 (1992).

"Strong" and "weak" thermal focussing or lensing can be defined as follows. When a "strong thermal lens" is generated, the focussing power of the pump-induced thermal lens is at least comparable to that of the other optics in the laser resonator. A strong thermal lens significantly changes the size and divergence of a laser resonator eigenmode within the laser resonator. With a "weak thermal lens", the focussing power of the pump induced lens is substantially lower than that of the other optics in the laser resonator, such as mirrors and typical lenses. The thermal lens can be considered weak if the other optics in the laser resonator dictate the size and divergence of the resonator eigenmode, while the thermal lens has little effect on the eigenmode properties. Typically, materials that exhibit strong thermal focussing or strong thermal lensing also exhibit strong aberrations, which have been detrimental to laser performance of the prior art.

Materials that exhibit strong thermal focussing can have other properties that make them suitable or desirable for certain applications. With respect to Nd:YLF, for example, Nd:YVO$_4$ exhibits high gain and a short upper state lifetime. Nd:YAG has an intermediate gain and an intermediate upper state lifetime. These properties provide important adjustable parameters when designing a Q-switched laser with high pulse energy or high repetition rate, or a laser that is insensitive to optical feedback. Additionally, certain properties of Nd:YVO$_4$ make it attractive for diode pumping; its absorption coefficient at the diode pump wavelength of ~809 nm is extremely high, permitting efficient coupling of diode pump light into the Nd:YVO$_4$ gain medium.

The materials Nd:YAG, Nd:YVO$_4$, and Nd:YLF are ready examples of materials with strong and weak thermal focussing characteristics, with Nd:YLF typically categorized as weak. Examples of materials that can exhibit strong thermal lenses are Nd:YAG and Nd:YVO$_4$. Pump-induced surface distortion can contribute to the thermal lens magnitude, but the effect in Nd:YVO$_4$ or Nd:YAG is primarily due to a strong dependence of the material's index of refraction upon the local temperature (dn/dT) in the material. While this dependence is about one order of magnitude smaller for Nd:YLF that it is for Nd:YAG and Nd:YVO$_4$, it should be noted that even the focussing, or defocussing, power of a thermal lens in a material like Nd:YLF must be considered in a laser resonator if its focussing power is comparable to that of the other intracavity optics. As an example of a weak thermal lens, it is usually possible to design a laser resonator using Nd:YLF in a way that results in a thermal lens of focussing power that is weaker than that of other intracavity optics. The aberrations in the thermal lens of Nd:YLF in this type of laser are also typically weak.

It is important to note that a diode-pump-induced thermal lens is not a perfect lens, but is rather an aberrated lens. In a typical high power diode-pumped laser design, a strong thermal lens is inherently an aberrated thermal lens. It is thought that the aberrations in the strong pump induced thermal lenses limit the efficiency of high power diode bar pumped lasers. See for example, S. C. Tidwell, J. F. Seamans, M. S. Bowers, A. K. Cousins, IEEE J. Quantum Electron. 24, 997 (1992). This is because the thermally-induced aberrations add significant diffractive loss to resonators when conventional mode-matching techniques are employed. An aberrated thermal lens is one where the optical path difference (OPD) as a function of radius cannot be adequately fit by a simple parabola. A hypothetical perfect thermal lens would have an OPD profile that could be fit by a perfect parabola. For a typical aberrated thermal lens, the optical path difference as a function of radius is most nearly parabolic near its center, but deviates strongly from a parabola in its wings, as heat flows out of the pumped center into the surrounding gain medium. See for example J. Frauchiger, P. Albers, H. P. Weber, IEEE J. Quantum Electron. 24, 1046 (1992).

It has been reported that the efficiency of a laser system with aberrated thermal lensing is reduced with respect to a laser system without aberrated thermal lensing because the thermal aberration acts as a pump-power dependent loss in the laser resonator. In order to make a relative comparison to a high power, high efficiency laser, this particular type of diode-pumped laser is used as a benchmark. The reference laser is a diode-bar-pumped Nd:YLF laser, as reported by S. B. Hutchinson, T. Baer, K. Cox, P. Gooding, D. Head, J. Hobbs, M. Keirstead, and G. Kintz, *Advances of 3–10 Watt Average Power Diode Pumped Lasers in Diode Pumping of Average Power Solid State Lasers*, G. F. Albrecht, R. J. Beach, S. P. Velsko, Editors, Proc. SPIE 1865, 61–72. The authors reported a diode-bar-pumped Nd:YLF laser that was designed in a way that the thermal lens of the Nd:YLF could be considered weak, therefore presented only weak thermal aberrations. This laser provided 6 W of polarized output power ($P_o$) in a $TEM_{00}$ mode of $M^2<1.1$ for 17 W of diode-bar pump power incident ($P_i$) upon the Nd:YLF gain media. The optical efficiency ($P_o/P_i$) of this laser is ~35%, while the optical slope efficiency ($dP_o/dP_i$) is ~40%. This laser is a highly efficient, high power laser and can be considered a benchmark as a high power, highly efficient diode-bar-pumped laser that operates in a nearly diffraction-limited $TEM_{00}$ mode. Any diode-bar-pumped laser with comparable power and optical efficiency in a nearly diffraction-limited $TEM_{00}$ mode can therefore be called a highly efficient, high power, diode-bar-pumped laser.

High power diode-bar-pumped lasers that have been built using gain mediums with strong thermal focussing have been reported to be less efficient than this benchmark. For example, using the same definitions, overall optical efficiencies ($P_o/P_i$) of only about 16% have been reported for diode-bar end-pumped Nd:YAG operating in the $TEM_{00}$ mode at the 6 W output level. The reported multimode efficiency achieved with Nd:YAG is higher, but multimode beams are not useful for many applications. See for example S. C. Tidwell, J. F. Seamans, M. S. Bowers, A. K. Cousins, IEEE J. Quantum Electron. 24, 997 (1992). A 26% optical efficiency ($P_o/P_i$) was reported for an Nd:YAG laser at the 60 W level, but the $TEM_{00}$ laser beam quality was worse than the benchmark at $M^2<1.3$, the beam was unpolarized, and the laser used an aspheric optic for aberration compensation that worked over only a narrow range of pump power. See for example S. C. Tidwell and J. F. Seamans, 60-*W Near TEM00, cw Diode-End-Pumped Nd:YAG Laser*, in Diode Pumping of Average Power Solid State Lasers, G. F. Albrecht, R. J. Beach, S. P. Velsko, Editors, Proc. SPIE 1865, 85–92, herein referred to as "Tidwell et al". One report also indicated a 36% optical efficiency ($P_o/P_i$) for a $TEM_{00}$ Nd:YAG laser at the 7.6 W output level, pumped by 38 individual, polarization combined, fiber coupled diode arrays that provided an incident power of 21.1 W. A serious drawback of this system is that diode bars were not used, hence the tremendous complexity, cost, and low wallplug efficiency ($P_o$ divided by electrical input power) of 38 individual polarization combined fiber-coupled diodes. This was reported by Y. Kaneda, M. Oka, H. Masuda, and S. Kubota, 7.6 *W of cw Rradiation in a $TEM_{00}$ Mode From a Laser-Diode-End-Pumped Nd:YAG Laser*, Opt. Lett. 17, 1003 (1992), herein referred to "Kaneda et al".

In spite of all of these difficulties, it would be useful to develop a diode-bar-pumped laser that can make use of gain medium materials with strong thermal focussing and still operate at high power with high efficiency in a nearly diffraction-limited $TEM_{00}$ mode. This is because some of these materials with strong thermal focussing have other desirable properties that make them desirable for certain applications. With respect to Nd:YLF, Nd:YVO$_4$ exhibits high gain and a short upper state lifetime. Nd:YAG has an intermediate gain and an intermediate upper state lifetime. These properties provide important adjustable parameters when designing a Q-switched laser with high pulse energy or high repetition rate, or a CW laser that is insensitive to optical feedback. Additionally, certain properties of Nd:YVO$_4$ make it attractive for diode pumping; its absorption coefficient at the diode pump wavelength of ~809 nm is extremely high, permitting efficient coupling of diode pump light into the Nd:YVO$_4$ gain medium.

Materials with strong thermal focussing characteristics like Nd:YAG and Nd:YVO$_4$ have been used in certain lasers with pump powers greater than 2 W. However, strong, aberrated thermal lenses are generated in end-pumped configurations. Additionally, strong thermal birefringence is seen in YAG. This is primarily because the index of refraction in these materials is a strong function of temperature (dn/dT is large), and the deposition of heat by the pump beam induces large thermal gradients. It has been generally believed that strong thermal focussing or lensing is a hindrance in the design and construction of an efficient laser with high beam quality, and therefore, there has not been great success in the use of materials with strong thermal focussing in highly efficient, high power diode-bar-pumped lasers.

Aberrations in the pump-induced thermal lens can be canceled or corrected with specially shaped aspheric lenses or aspheric gain medium faces within the laser cavity. Ideally, if the pump-induced aberrations are perfectly corrected, a favorable ratio R (greater than unity) of $TEM_{00}$ mode diameter to pump beam diameter can be employed, and optical efficiencies can approach those of more conventional mode-matched lasers that do not have significant aberration. There are, however, some major limitations to these types of non-dynamic compensation schemes. They do not work well over a range of pump powers since the magnitude of the thermal lens, and its aberrations, is a dynamic function of the pump and intracavity powers. These designs have limited appeal because they work over a very small range of diode pump powers. However, they have been explored, (see Tidwell, et al).

When Nd:YAG is used as the laser medium, an additional problem arises in a high-power, end-pumped geometry. This effect is thermal birefringence, and is well-known in lamp-pumped Nd:YAG lasers (see for example Koechner, *Solid-State Laser Engineering*, vol. 3, p. 393). Many laser applications require a polarized beam; thermal birefringence results in spatially-dependent polarization rotation of parts of the eigenmode within the cavity and thus loss when the eigenmode passes through an intracavity polarizer. This loss can be significant, and can severely limit the output power of a polarized laser. See for example Kaneda et al and Tidwell et al. In some cases, when multiple Nd:YAG gain mediums are used, polarization rotation schemes can be used to induce cancellation of thermal birefringence between similarly-pumped Nd:YAG gain mediums (see Tidwell et al). However, the techniques of the prior art are imperfect, and are difficult to implement when only one gain medium is placed within the laser resonator. It would be desirable to minimize thermal birefringence in an end-pumped Nd:YAG gain medium, or in any gain medium where the magnitude of thermal birefringence is detrimental.

A need exists for highly efficient lasers. A low efficiency laser requires more diode pump power to achieve a desired laser output power. Increasing the pump power from a particular diode bar source increases the temperature of the diode junction, and the lifetime of the diode source is degraded in a predictable but highly undesirable way. This is unacceptable for applications that require long life. A low efficiency laser may require the use of additional diode sources to achieve a particular laser output power. This may be unacceptable for applications that are sensitive to cost or complexity.

A need exists for a highly efficient, high power laser design that uses materials with strong thermal focussing properties but provides high quality beams over a range of pump powers. There is a need for a solid state diode pumped laser which has reduced thermal berefringence. There is a further need for a solid state diode pumped laser with a resonator length of 1 to 10 Rayleigh ranges.

SUMMARY OF THE INVENTION

Accordingly, an object of the invention is to provide a diode-pumped laser utilizing a gain medium with strong thermal focussing, and the laser is highly efficient while operating in the $TEM_{00}$ mode and producing a polarized output.

Another object of the invention is to provide a diode-pumped laser that is highly efficient, and the ratio of the $TEM_{00}$ mode diameter to the pump beam diameter in the gain medium is less than unity.

Yet another object of the invention is to provide a diode-pumped laser using an Nd:YVO$_4$ or Nd:YAG gain medium.

A further object of the invention is to provide an efficient laser with an Nd:YVO$_4$ or Nd:YAG gain medium that operates in the $TEM_{00}$ mode when directly end-pumped or longitudinally-pumped by a diode bar pump source.

Another object of the invention is to minimize the losses due to thermal birefringence that are induced by high power pumping of Nd:YAG, or any other material where thermal birefringence is problematic.

Yet another object of the invention is to provide a diode pumped laser with a resonator that has a length of 1 to 10 Rayleigh ranges.

A further object of the invention is to provide an efficient laser with an Nd:YAG gain medium that operates in a polarized $TEM_{00}$ mode when end-pumped by a fiber bundle coupled diode bar pump source.

Still a further object of the invention is to provide an efficient laser with a strong thermal lens gain medium with a dopant level in the range of 0.01 to less than 0.5%.

These and other objects of the invention are achieved in a diode pumped laser that includes a resonator mirror and an output coupler, defining a laser resonator with a resonator optical axis. A strong thermal lens gain medium with a $TEM_{00}$ mode diameter is mounted in the resonator along the resonator optical axis. The gain medium can have different dopanat ranges of 0.01, 0.05 and 0.01 to less than 0.5%. A diode pump source supplies a pump beam to the gain medium in the laser resonator, and produces an output beam with a diameter larger than the $TEM_{00}$ mode diameter to reduce thermal birefringence. A power source supplies power to the diode pump source. A polarizing element can be positioned in the resonator, along with a aperture stop, and the gain medium can be Nd:YAG.

In one embodiment, the resonator has a length of 1 to 10 Rayleigh ranges.

In another embodiment, a pump induced thermal lens with a focal length $f_x$ in a x direction, a focal length $f_y$ in a y direction, and a desired fx/fy ratio is provided in order to control the ellipticity of the thermal lens. Included is an anisotropic gain medium with opposing first and second end faces through which a pump beam and an output beam pass. A mount supports the gain medium and directs heat flow in the gain medium in a direction that produces the desired $f_x/f_y$ ratio. A very useful ratio is $f_x/f_y \sim 1$.

Nd:YVO$_4$ is one of the preferred gain mediums. Nd:YAG is also a preferred gain medium. The classical elliptical thermal lens properties of the gain medium are modified so the laser produces a round beam. This can be achieved by creating a heat conduction path through the "c" axis gain medium faces that are normal to a "c" axis of the gain medium. The "a" faces of the gain medium, normal to the "a" axis of the gain medium, are thermally isolated. Nd:YVO$_4$ is a useful gain medium because it exhibits high gain and a short upper state lifetime. These properties make the laser particularly useful for short pulse, high repetition rate Q-switching and in applications where insensitivity to optical feedback is important. The upperstate lifetime is approximately five times shorter than that of Nd:YLF, while the stimulated emission cross section is about seven times larger than that of Nd:YLF. Oscillations due to feedback damp out on the order of seven times faster in a high power Nd:YVO$_4$ laser than in a high power Nd:YLF laser. This is significant for image recording applications. An additional positive attribute of Nd:YVO$_4$ is that its absorption coefficient at the diode pump wavelength of ~809 nm is extremely high, efficient coupling of diode pump light into the Nd:YVO$_4$ gain medium is possible.

Management of heat flow in the gain medium produces the desired $f_x/f_y$ ratio for the thermal lens, and hence the ellipticity of the thermal lens is controlled. In one embodiment, using Nd:YVO$_4$, creating a heat conduction path along the "c" gain medium faces produces a substantially round thermal lens. The ratio of the $TEM_{00}$ mode size to the pump beam size is less than unity, which is known to minimize diffractive loss but has been reported to result in an inefficient $TEM_{00}$ laser. A plurality of fibers, gathered into a bundle, can be used to guide the diode pump light, creating the top hat shaped pump beam geometry. In spite of an unfavorable ratio of $TEM_{00}$ mode size to pump beam size, the laser is highly efficient in a high power, polarized, $TEM_{00}$ mode.

The laser's optical slope efficiency in the $TEM_{00}$ mode is greater than 40%, and the overall optical efficiency greater than 30%. For example, when Nd:YVO$_4$ is used, 7 W of polarized, nearly diffraction limited output are generated for 16 W of pump power. Multiple pump source designs yield over 50 W output comparable efficiencies. The ratio of the TEM$_{00}$ mode diameter to the nearly top hat shaped pump beam can be in the range of 1.2 to about 0.6, and preferably about 0.83. A diffraction limited gaussian output beam is generated that is a substantially round. The M$^2$ of the output beam is typically less than about 1.2, and can be as low as 1.05, and the least squares deviation of the beam profile from a gaussian is less than about 10%, and is as low as 1%. The combination of a strong thermal lens material, high power pumping and an end-pumped "non-mode-matched" geometry with a fiber bundle coupled diode pump source results in a high power, highly efficient, TEM$_{00}$ laser which produces a polarized output. The laser of the present invention works well over a large range of pump power without any aberration compensation schemes.

Similar performance is achieved with Nd:YAG as the laser medium. An intracavity polarizer, such as a Brewster plate, is required to insure well-polarized output. In Nd:YAG, not only are thermal lensing and thermal aberrations problematic, but thermal birefringence is as well. With the present invention, losses due to these effects are reduced significantly when the TEM$_{00}$ mode diameter in the gain medium is slightly smaller than the pump beam diameter in the gain medium. The strongest depolarization effects are seen when mode sizes typical for conventional mode matching are used; if the TEM$_{00}$ mode size is larger than the high power pump beam, then parts of the TEM$_{00}$ beam pass through the thermally birefringent areas, experience rotation, and then rejection or loss by an intracavity polarizer. In contrast, with the present invention, a pump beam size slightly larger than the TEM$_{00}$ mode diameter in the gain medium minimizes losses due to birefringence.

Certain types of laser resonators that incorporate gain mediums with strong thermal focussing are less sensitive to the loss that is presented by the non-parabolic phase aberrations in the thermal lens. These designs are less sensitive to this loss even when more conventional pump beam to mode size ratios are used, as in a ratio of less than 1. These resonators are typically configured to be on the order of one to ten Rayleigh ranges, more preferably two to four in length. The Rayleigh range is calculated for an intracavity waist or a nearby extracavity waist.

A diode pumped laser with a gain medium that exhibits strong thermal focussing can be used for applications that require high efficiency, high power, and a high quality, polarized beam from a simple reliable laser source.

DETAILED DESCRIPTION

The invention is a nearly diffraction limited, high power, end-pumped, high efficiency diode pumped laser. It includes at least one resonator mirror and an output coupler. These define a laser resonator with a resonator optical axis. A strong thermal lens gain medium is mounted in the resonator. A diode pump source supplies a pump beam to the gain medium, producing a polarized substantially round output beam.

The laser's optical efficiency is greater than 25%. High power TEM$_{00}$ operation of the laser is an output beam greater than 4 W in a TEM$_{00}$ mode. Its output is substantially TEM$_{00}$, or near diffraction limited, if at least 95% of the entire output beam is measured to an M$^2$ value less than 1.2, where M$^2$ is defined as the ratio of theoretical confocal parameter of a beam as predicted by an extracavity waist size to the actual measured confocal parameter. The output beam has a least squares deviation with nearly all of the actual beam profile from an ideal gaussian profile of less than 10%. Additionally the output beam is polarized. In certain embodiments, the laser may use a gain medium where the diode pump induced thermal lens in the gain medium provides an optical path difference as a function of radius that is not described by a parabolic profile.

Figure 1:
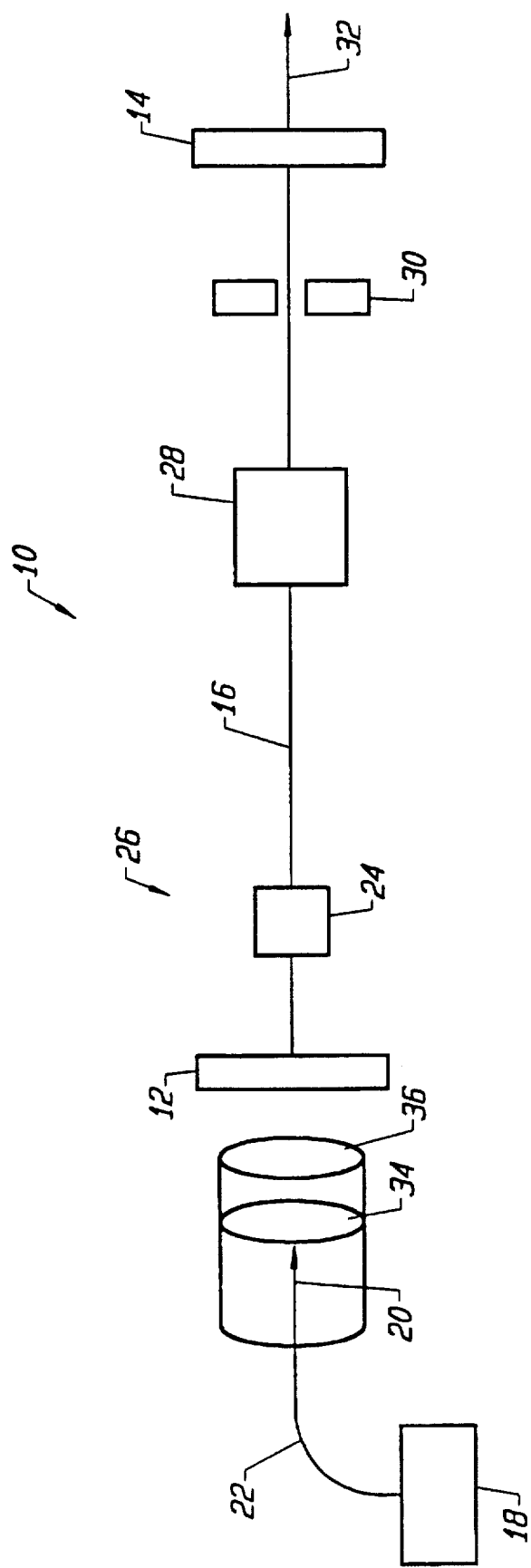
FIG. 1 is a schematic diagram of the diode pumped laser with the strongly focussing/strongly aberrating gain medium positioned within the resonator.

Referring to FIG. 1, a diode pumped laserhead 10 is defined by a resonator mirror 12, an output coupler 14 and a resonator optical axis 16. A diode source 18 provides a pump beam 20. Resonator mirror 12 is highly transmitting at the diode pumping wavelength of diode source 18. This standard optical coating can be applied to a surface of the gain medium. A plurality of resonator mirrors can be used. Diode source 18 can be a single diode, spatial emitter, diode bar or a plurality of diodes or diode bars. Preferably, a diode bar is used because it provides high power. A suitable 20 W diode bar source 18 is model No. OPC-A020-810-CS, available from OptoPower Corporation, City of Industry, Calif., or a similar device denoted B020. Preferred wavelengths of diode source 18 are in the range of 780 to 815 nm. Peak absorption wavelengths of specific gain mediums are as follows: Tm:YAG—785 nm; Nd:YLF—797 nm; and Nd:YAG and Nd:YVO$_4$—809 nm. The diode pump source wavelengths are temperature tuned to optimize absorption in the gain medium.

Increasing the pump power into a given diode pumped laser increases the strength of the thermal lens in the gain medium. The resultant change in the ratio of the $TEM_{00}$ mode diameter to the pump beam diameter could lead to reduced laser performance. A preferred method to reduce thermal lensing and maintain ratios of the $TEM_{00}$ mode diameter to the pump beam diameter of less than unity is to use reduced concentrations of dopant levels in the laser medium. $Nd:YVO_4$ with dopant levels in the range of 0.01. 0.05 and 0.1 to less than 0.5% are available from CASIX, Inc. from Monrovia, Calif. Maximum performance of the diode pumped laser is achieved by optimizing the dopant level, and thus, the thermal lensing for a particular pump power level. An embodiment configured for pump power levels greater than 26 W utilizes $Nd:YVO_4$ of dopant level approximately 0.2%.

Diode source 18 is coupled to one or more optical fibers 22. Preferably, a bundle of optical fibers 22 are utilized. Suitable fibers 22 include but are not limited to those that have silica cores with silica cladding. Coupling can be accomplished as set forth in U.S. Pat. No. 5,127,068. While the preferred embodiments utilize fiber-coupled diode bars, it should be noted that the principles of the invention also apply to diodes that are not fiber-coupled.

Positioned along optical axis 16 is a gain medium 24 with strong thermal focussing properties mounted in a heat sink 26. The characteristics of gain medium 24 are that its indices of refraction vary as a function of temperature, particularly in high power end-pumped geometries. With higher pump powers, greater than about 5 W, the effect of thermally induced phase aberrations are significant. This variation of the indices of refraction is on the order of about $3\times10^{-6}/°K$ for light polarized parallel to the "c" axis of $Nd:YVO_4$.

Suitable gain medium 24 materials include but are not limited to $Nd:YVO_4$, $Nd:GVO_4$ $Nd:YPO_4$, Nd:BEL, Nd:YALO and Nd:LSB. Nd:YAG can be used when an intracavity polarizing element is present. A preferred gain medium 24 material is $Nd:YVO_4$, available from Litton-Airtron, Charlotte, N.C. The atomic percentage of Nd is in the range of 0.1 to 3.0%, preferably about 0.6 to 0.9%. One preferred embodiment utilizes 0.7 atomic percent, while another utilizes approximately 0.5% $Nd:YVO_4$.

It is known that the thermal aberrations in Nd:YLF are approximately an order of magnitude less than those of high aberration materials in similar end-pumped geometries because dn/dT is much smaller than that for Nd:YAG and $Nd:YVO_4$. $Nd:YVO_4$ is an attractive material because, compared to Nd:YLF, it exhibits high gain and a short upper state lifetime. Nd:YAG has an intermediate gain and an intermediate upper state lifetime which is also useful. $Nd:YVO_4$ is also suitable for diode pumping because its absorption coefficient at the diode pump wavelength of ~809 nm is extremely high, permitting efficient coupling of diode pump beam 20 into gain medium 24.

These properties are important when designing a Q-switched laser, or one that is insensitive to optical feedback. For example, $Nd:YVO_4$ can be used for short pulse, high repetition rate Q-switching, and also allows oscillations due to optical feedback to damp out about 7 times faster than in Nd:YLF. This is critical for high speed image recording. Optionally included in laserhead 10 is a Q-switch 28. A Q-switch 28 is available from NEOS Technologies, Melbourne, Fla. This acousto-optic Q-switch can be made of a high index glass, like SF10, or can be made of quartz. The diffraction efficiency of the device must be adequate to "spoil" the cavity, or "hold off" laser oscillation. Additionally, the rise and fall time of the acoustic wave in the device must be suitably fast in order to achieve efficient energy extraction from the laser. These requirements are relatively well known by those of skill in the art. Also included in laserhead 10 is an aperture stop 30 to improve the generation of a $TEM_{00}$ output beam 32.

A pair of standard spherical lenses 34 and 36, available from Melles Griot, Irvine, are used to image and overlap a portion of pump beam 20 onto an optical end face of gain medium 24. Lenses 34 and 36 optimize the size of pump beam 20 to a particular ratio R of $TEM_{00}$ mode size to pump beam size, and also optimize the size of pump beam 20 to avoid fracture of gain medium 24 while increasing output power. An optimal ratio R is about 0.83 for pump powers on the order of 10 to 15 W and pump spot diameters of 0.6 to 0.7 mm. Other devices that can be used to achieve the imaging include but are not limited to single lenses or reflective optics. Those of skill in the art will recognize this pumping geometry as end-pumped or longitudinally-pumped. While fiber-coupled diode bars are used in these embodiments, the techniques apply to diodes that are not fiber-coupled as well.

The length of the cavity defined in laserhead 10 can vary. A suitable length is in the range of about 3 to 30 cm. In one embodiment it is about 10 cm.

Figure 2:
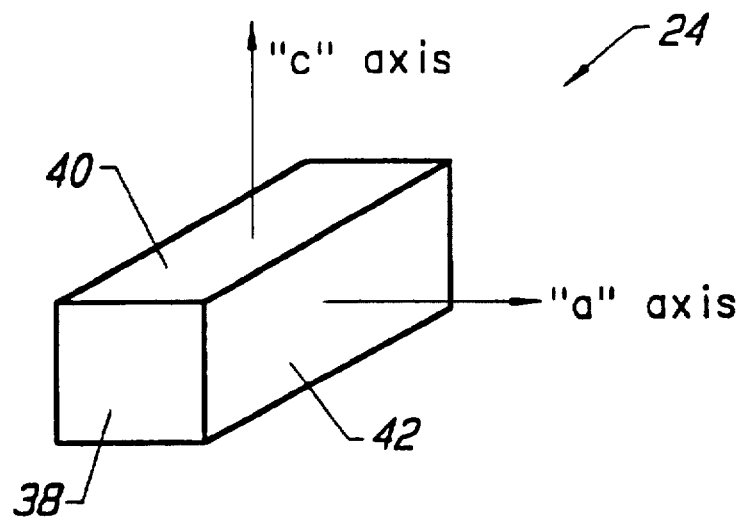
FIG. 2 a perspective view of the strongly focussing/ strongly aberrating gain medium in a non-cylindrical geometry showing an optical end face, one of the "c" axis gain medium faces that is normal to a "c" axis of the gain medium and one of the "a" axis gain medium faces that is normal to an "a" axis of the gain medium. This gain medium can be Nd:YVO$_4$.

In FIG. 2, gain medium 24 is shown having an end face 38, a "c" axis gain medium face 36 normal to a "c" axis of gain medium 24, and an "a" axis gain medium face 38 normal to an "a" axis of gain medium 24. This terminology refers to a uniaxial gain medium 24 like $Nd:YVO_4$; the labels do not apply to Nd:YAG. Faces 38, 40 and 42 have corresponding opposing faces, not shown, that are flat, generally parallel but may be wedged in an amount of about 1°.

The geometry of gain medium 24 can vary. Although a cylindrical geometry is possible (such as for Nd:YAG), non-cylindrical is preferred. Suitable geometries are cubic or rectangular. Geometry and size of gain medium 24 are important considerations. In one embodiment, gain medium 24 has end face 38 dimensions of greater than 1 mm, and preferably about 3 to 4 mm. The length of gain medium 24 can correspond to the dimensions of end face 38. Additionally, in the rectangular geometry, a length of about 1 to 10 mm is suitable, and more preferably about 4 to 8 mm.

The actual size of gain medium 24 is important. If it is infinitely large, then heat flow is difficult to manage and an elliptical output beam is typically generated when $Nd:YVO_4$ is used. In this instance, the exterior surfaces of gain medium 24 have thermal gradients that are too low to control the heat conduction path. However, control of heat conduction is much easier and pronounced with smaller gain mediums 24. In this case, the aperture size of the gain medium 24 is somewhat larger than the $TEM_{00}$ mode size of the laser eigenmode in gain medium 24 and somewhat larger than the pump beam size in gain medium 24. As an example, a pump beam size of 0.6 to 0.7 mm and a gain medium width/height of 3 to 4 mm works well.

Optical, thermal and mechanical characteristics of the $Nd:YVO_4$ gain medium 24 are different along the "a" and "c" axes. The thermal expansion coefficient in a direction parallel to the "a" axis is about 2.5 times smaller than that parallel to the "c" axis. The variation of the index of refraction as a function of temperature is different by about a factor of about 2.8 along the "c" and "a" axes. Because $Nd:YVO_4$ is so strongly birefringent, there is more than a 10% difference between the indices of refraction for the two crystallographic axes. It should be understood that while the axes of $Nd:YVO_4$ are described in this embodiment, other gain mediums 24 with different axes orientations could be mounted in similar ways to achieve similar effect. This includes both uniaxial and biaxial gain mediums 24.

Figure 3:
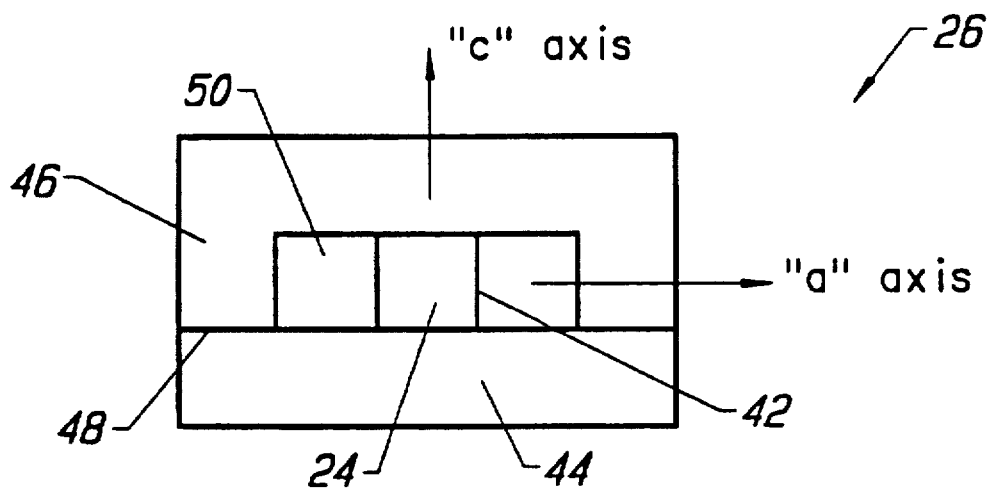
FIG. 3 is a sectional diagram of the strongly focussing gain medium mounted in a heat sink.

As shown in FIG. 3, gain medium 24 can have a thermal lens of controlled ellipticity, such as circular, by proper mounting to heat sink 26. Heat sink 26 can be made of copper but other suitable materials include aluminum or alumina. Heat sink 26 can be configured into sections 44 and 46. A solder 48 is deposited on "c" axis gain medium face 36 (if the gain medium 24 is Nd:YVO$_4$), as well its corresponding opposing face, in order to reduce thermal impedance between the faces and heat sink 26. A suitable solder has a low melting temperature, such as Indium Solder 1E, available from the Indium Corporation of America, Utica, N.Y. Another solder is pure indium, also available from the Indium Corporation. Other materials are possible and can include thermally conductive epoxies such as Tra-Bond 2151, available from Tra-Con, Inc., Medford, Mass., as well as thermal greases including Dow Corning 340, available from Dow Corning Corporation, Midland, Mich. Heat sink 26, and its respective sections 44 and 46, can be plated in order to improve the adherence to the solder. Satisfactory plating materials include but are not limited to nickel or silver. An air gap 50 is formed at the exterior of "a" axis gain medium face 42 and its corresponding opposing face.

Sections 44 and 46 can be "tinned" with indium prior to assembly with gain medium 24. One technique for soldering gain medium 24 in place is to wrap it in one or two layers of 1–5 mil indium foil, position it between sections 44 and 46 of the pretinned heat sink 26, and then place the entire assembly on a hot plate at about 175° C. This can be done in a controlled atmosphere, i.e. one with very little oxygen. Additionally, the surfaces to be soldered can be gold-plated prior to soldering.

The present invention also provides a high power, solid state diode pumped laser with a uniform bond between gain medium 24 and heat sink 26. The uniform bond is, (i) low stress, (ii) reliable with a long-term life, and (iii) provides good thermal conductivity. The soldering is done with an indium based solder in a controlled atmosphere. Oxygen is removed in order to eliminate the production of oxides which can make the bond less uniform. For this purpose, it is helpful to include some H$_2$ to remove oxides.

Figure 4:
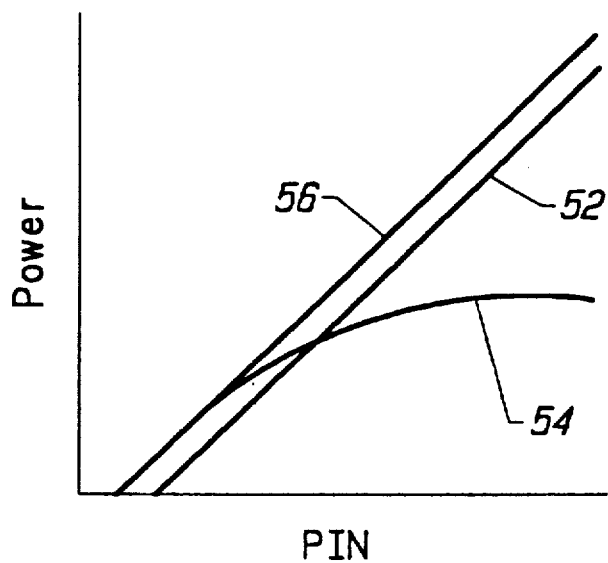
FIG. 4 is a graph illustrating the output power of three lasers. The first has a gain medium with weak thermal lensing and low aberrations, the second uses a gain medium with strong thermal lensing and therefore strong aberrations high aberrations, and the third is one embodiment of the present invention where only a portion of the pump beam is focussed on the TEM$_{00}$ mode diameter.

Air gap 50 creates thermal isolation between the "a" axis gain medium faces and heat sink 26. Alternatively, air gap 50 can be eliminated by substituting an insulating material between heat sink 26 and the "a" axis gain medium faces. Suitable insulating materials include but are not limited to epoxies such as 2135D, available from Tra-Con, Inc., Medford, Mass. A heat conduction path, not shown, transfers thermal energy from gain medium 24 out through the "c" axis gain medium faces. Managing the heat flow in this manner produces a round, diffraction limited output beam 32. This technique applies to Nd:YVO$_4$, for example. When Nd:YAG is used as gain medium 24, it is more common to cool all sides of gain medium 24 to induce a primarily radial heat flow. As shown in FIG. 4, diffraction loss due to aberrative lensing in an end-pumped system with a classic mode-matched geometry results when a strong thermal lens and aberration material, such as Nd:YVO$_4$ is end-pumped. Line 52 represents a material such as Nd:YLF where there is little thermal aberration loss because the thermal lens is weak. The thermal lens generated in Nd:YVO$_4$ is strong, and aberrated. With Nd:YVO$_4$, if a classic mode-matched geometry is used, significant diffractive loss is experienced by the TEM$_{00}$ mode, and output power rolls off as pump power is increased, as illustrated by line 54. If only the central part of pump beam 20 overlaps the TEM$_{00}$ mode in Nd:YVO$_4$ gain medium 24, then the amount of thermal aberration acting as a loss is greatly reduced. If optimized by adjusting the ratio of the TEM$_{00}$ mode diameter to the pump beam diameter, to a value slightly less than unity, performance of the "non-mode-matched" Nd:YVO$_4$ laser can be that of line 56. It can be superior to line 52, which is not taught in the prior art. A high power, high efficiency TEM$_{00}$ laser results. This is also true for Nd:YAG.

Figure 5:
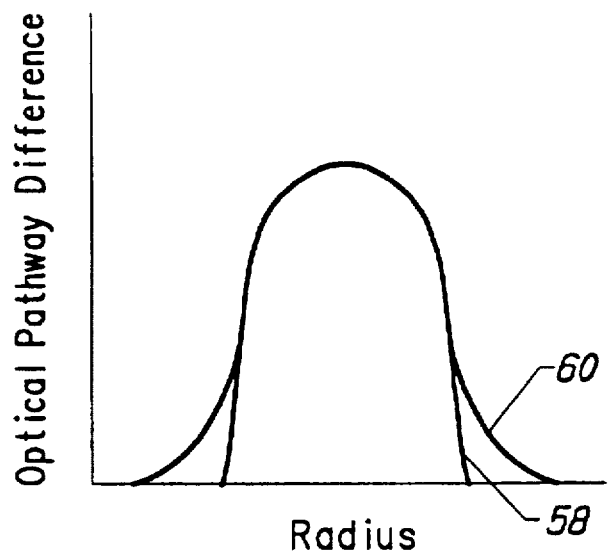
FIG. 5 is a graph, shown as a parabola, of the optical pathway difference as a function of radius for a perfect lens, and compares it with the strong pump induced non-parabolic phase distortions typical with high aberration materials.

Nd:YVO$_4$ can act as a thermal lens, as can Nd:YAG. As illustrated in FIG. 5, a perfect lens provides an optical pathway difference as a function of radius that results in a perfect parabola 58. With a strong thermal lens and strong aberration material like Nd:YAG or Nd:YVO$_4$, pump-induced non-parabolic phase distortions lower the efficiency of the laser operating in the TEM$_{00}$ mode. Instead of the perfect parabola 58, the resulting profile has aberrated wings, represented by distorted parabola 60.

Figure 6:
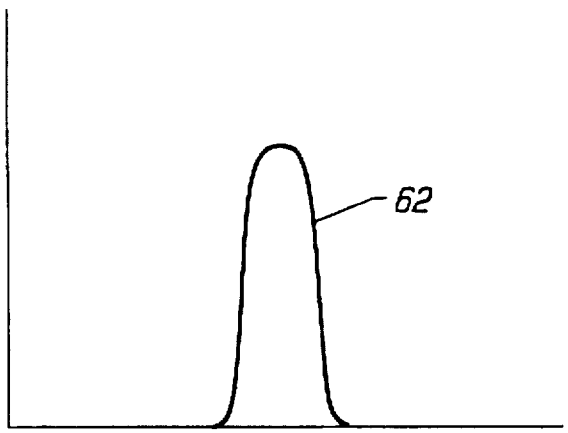
FIG. 6 illustrates the gaussian profile output that is typical of a diode pump source with a single optical fiber.
Figure 7:
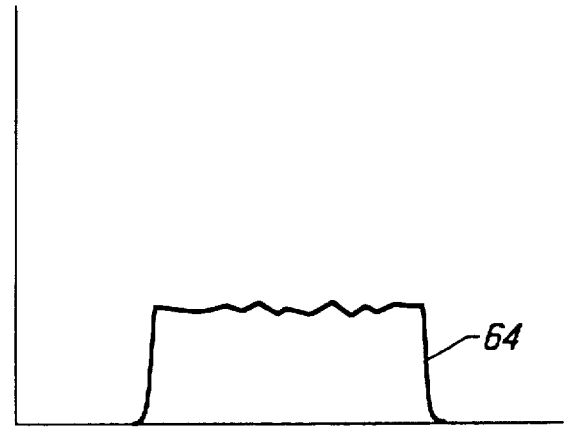
FIG. 7 illustrates the top hat profile output associated with multiple bundled fibers.

Single optical fibers have a peak intensity that results in a semi-gaussian or super-gaussian shaped pump beam 62, shown in FIG. 6. When a bundle of fibers is used, the combination does not yield as pronounced a peak intensity. Instead, the combination produces a square or super-gaussian shape, commonly referred to as a "top hat" shaped beam geometry 64, illustrated in FIG. 7. This desirable top-hat or flat-top shaped beam might also be accomplished with optics other than optical fibers.

The central portion of an end-pump-induced thermal lens, such as Nd:YAG or Nd:YVO$_4$, is a better approximation to a perfect lens than are its aberrated wings. Because of this affect, in one embodiment only the central portion of pump beam 20 is used to overlap the TEM$_{00}$ mode at optical end face 38. This is achieved by focussing pump beam 20 through lenses 34 and 36 to the desired size. Suitable ratios of TEM$_{00}$ mode diameter to pump beam diameter are from 1.2 to as low as 0.6. In one embodiment, it is 0.83.

Figure 8:
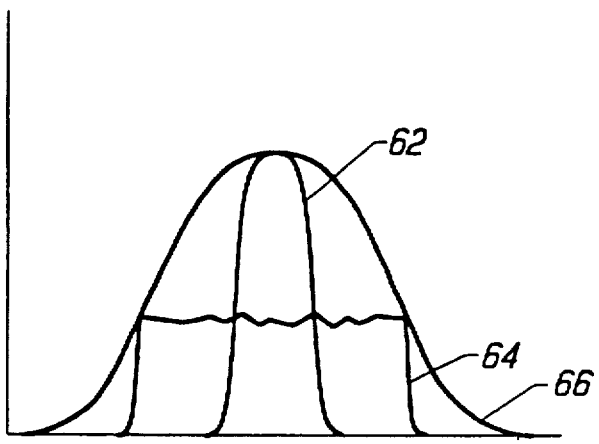
FIG. 8 is a graphical representation illustrating the relationship between the TEM$_{00}$ pump diameter and the top hat profile of FIG. 7.

The ratio of the TEM$_{00}$ mode diameter in gain medium 24 to the diameter of pump beam 20 is less than unity in one embodiment. When a fiber bundle is utilized, the ratio of the TEM$_{00}$ mode diameter of gain medium 24 to the diameter of nearly top hat shaped pump beam 20 is less than unity to about 0.83. This is in contrast to prior teachings that a ratio less than unity is inefficient. Rather, this laser is high power and highly efficient. The respective diameters are illustrated in FIG. 8, where the TEM$_{00}$ diameter is 62 and the top hat pump beam diameter is 64 while a more conventional mode-matched TEM$_{00}$ diameter is shown in 66.

Conventional mode matching, in the absence of thermal lensing, dictates that the ratios of the TEM$_{00}$ mode diameter to the diameter of pump beam 20 should be optimized according to the following:

$$Q = \int\int\int Io(r,z) Po(r,z) dV,$$

where Io(R,z) is the normalized intensity distribution of the TEM$_{00}$ mode in the gain medium, and Po(r,z) is the normalized distribution of absorbed pump light in the gain medium.

For conventional mode matching, the factor Q should be maximized in order to minimize laser threshold and maximize slope efficiency. It is known that for conventional mode matching, this overlap factor Q is maximized when the pump beam diameter in the gain medium is smaller than the TEM$_{00}$ mode diameter in the gain medium. This occurs when the ratio R1 of TEM$_{00}$ mode diameter to pump beam diameter in the gain medium is greater than 1. The TEM$_{00}$ mode diameter in the gain medium is defined traditionally as the diameter at which the mode intensity is $1/e^2$ (~13.5%) of its peak intensity. The pump beam diameter in the gain medium is defined as the diameter of the image of the pump beam in the gain medium; the intensity distribution of the pump beam is close to a "top hat" profile. The ratio R of the $TEM_{00}$ mode diameter to the pump beam diameter in the gain medium is greater than unity in a conventional mode-matched laser. In the present invention, it is less than unity. In combination with the strong thermal lens, this "non-mode matched" configuration yields a high power, highly efficient $TEM_{00}$ laser.

Although prior investigators have indicated that ratios R less than unity should result in lasers that are not efficient, for either low or high aberration materials, the present invention produces a different result. In one embodiment, the combination of a strong thermal lens gain medium 24, such as $Nd:YVO_4$, management of heat conduction of gain medium 24 through its "c" gain medium faces, and a ratio of $TEM_{00}$ mode diameter to pump beam diameter in the gain medium of less than unity and the use of a fiber-coupled diode bar pump source 18 results in a highly efficient high power laser that operates in the $TEM_{00}$ mode over a wide range of pump powers and produces a polarized output. Similar results are obtained with Nd:YAG, but with different output coupling, which is typical re-optimized when a different laser material is used.

Figure 9:
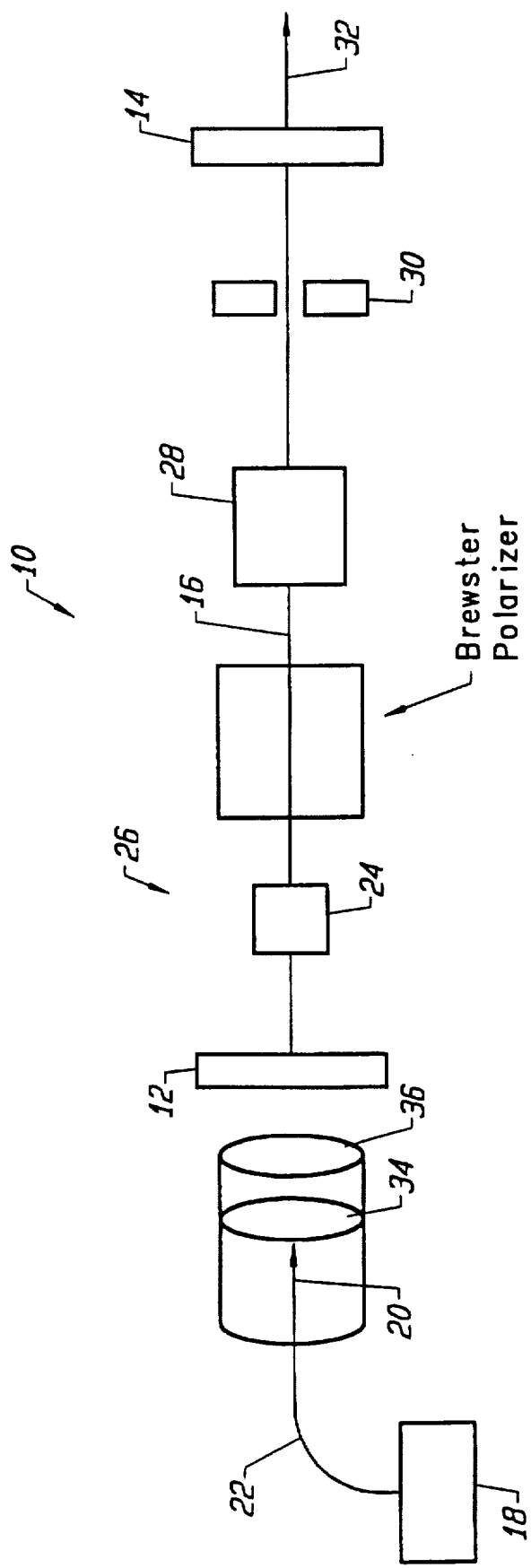
FIG. 9 is a diode-pumped Nd:YAG configuration, including a polarizer and an aperture stop.

Nd:YAG can be used in a similar manner to that described for $Nd:YVO_4$, with similar results. A difference is that Nd:YAG is not naturally birefringent. To achieve a polarized output, a polarizing element is typically used, like a Brewster plate, as in FIG. 9. An additional problem with Nd:YAG when used at high power is thermal birefringence. This is combined with the losses due to aberrations in the thermal lens. With the present invention it is found that the losses due to both effects are reduced significantly when the $TEM_{00}$ mode diameter in gain medium 24 is slightly smaller than the pump beam diameter in gain medium 24. The strongest depolarization effects are seen when mode sizes typical for conventional mode matching are used; if the $TEM_{00}$ mode size is larger than the high power pump beam, then parts of the $TEM_{00}$ beam pass through the birefringent areas, experience rotation, and then rejection by an intracavity polarizer. With the present invention a pump beam size slightly larger than the $TEM_{00}$ mode diameter in gain medium 24 minimizes losses due to birefringence. This is because the areas of greatest rotation are at the edges of the nominally cylindrical pumped volume. By designing the laser cavity to generate an eigenmode that is slightly smaller than the pump beam in gain medium 24, losses due to thermal birefrigence are minimized. There is a trade-off between the effects of conventional mode-matching or mode-overlap and the detrimental effects of thermal aberration and thermal birefringence. With the present invention, an optimum performance is found when the pump beam size is close to that of the $TEM_{00}$ diameter, or even slightly smaller.

Figure 10:
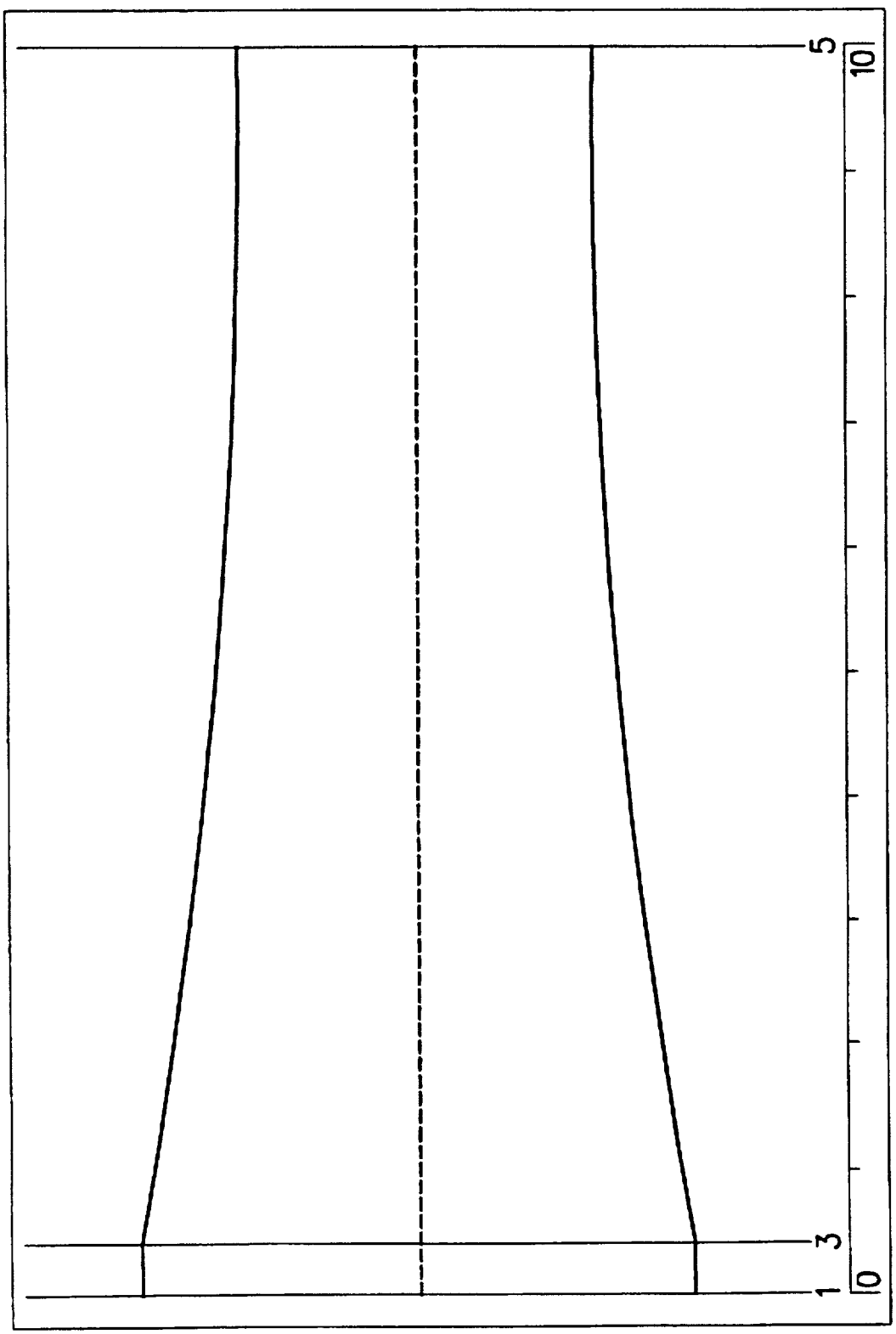
FIG. 10 is diagram of the mode diameters in a diode end-pumped solid-state laser wit a strong thermal lens.

Certain types of laser resonators that incorporate gain mediums 24 with strong thermal focussing are less sensitive to the loss that is presented by the non-parabolic phase aberrations in the thermal lens. These designs are less sensitive to this loss even when more conventional pump beam to mode size ratios are used, as in a ratio of less than 1. These resonators are typically configured to be on the order of 1 to a 10 Rayleigh ranges in length, preferably 1 to 5, and more preferably 2 to 4, with the Rayleigh range being calculated for an intracavity waist or a nearby extracavity waist. FIG. 10 depicts a plot of mode size in a resonator of this type. These types of resonators are less sensitive to phase aberrations than others; for example, a resonator with a large mode size everywhere in the resonator. The example in FIG. 10 is a resonator about 10 cm in length, with a thermal lens of effective focal length 14 cm at one end of the cavity, near a flat dichroic high reflector. The output coupler is curved with a 60 cm ROC in this example. It is about 2 Rayleigh ranges in length. This resonator configuration is highly efficient for pump sizes slightly smaller or slightly larger than the $TEM_{00}$ mode size. This resonator configuration can be scaled to a factor of two larger power by using the flat dichroic in FIG. 10 as a plane of symmetry, and doubling the resonator about this plane. The scaled resonator features two 14 cm focal length thermal lenses near the center of the cavity. The mode size as a function of position is also nearly mirrored about the plane between the two thermal lenses. This cavity is about four Rayleigh ranges in length. The two thermal lenses can be generated by two fiber-coupled diode pump sources and imaging optics, for example.

The laser of the present invention can have the following characteristics: output powers in the range of about 1 to 12 W, 12 to 26 W and greater than 26 W; an overall optical efficiency greater than about 25%; an optical slope efficiency in a $TEM_{00}$ mode of greater than 40%; a ratio of the $TEM_{00}$ mode diameter to the pump beam diameter in gain medium 24 in the range of about 1.2 to 0.8, preferably less than 1.0 to 0.83; an $M^2$ of less than 1.2, and preferably less than about 1.05; and a least squares deviation of a beam profile from a gaussian of less than about 10%, and preferably about 1%.

In one embodiment, laserhead 10 has a length of about 10 cm. A $Nd:YVO_4$ gain medium 24 is mounted in heat sink 26 and positioned along optical axis 16. Gain medium 24 has a cubic geometry and measures 4 mm along each side. Heat conduction from gain medium 24 is affected along the "c" axis gain medium faces, and the "a" axis gain medium faces are thermally isolated. If Nd:YAG is used, all four sides of gain medium 24 are cooled; a rod can also be used. A bundle of optical fibers is coupled to a 10–20 W diode bar 18 and produces a top hat shaped pump beam 22. Pump beam 22 is imaged by lenses 34 and 36 onto optical end face 38 of gain medium 24 so that only the central portion of the pumped volume is utilized. The pump power can be 5 to 17 W at the gain medium face, and the resulting thermal lens can have a focal length of 10 to 20 cm, with 13–15 cm being common with $Nd:YVO_4$ or Nd:YAG. The ratio of the $TEM_{00}$ mode diameter of gain medium 24 to the diameter of top hat shaped pump beam 22 can be less than unity, and as low as 0.83. A polarized, round, diffraction limited gaussian output beam 32 with 7 W of output is produced. Output beam 32 has an $M^2$ less than about 1.05. The least squares deviation of the beam profile from a gaussian is less than 1%. Optical slope efficiency of laserhead 10 is about 50% and the overall efficiency about 37.5%. This is highly efficient and has high power. A Q-switch can be incorporated into the laser resonator if pulsed operation is desired. Similar lasers that use more than one diode pump source produce more than 26 W, using similar mode size and pump size techniques to produce a high power highly efficient $TEM_{00}$ laser output.

The laser is useful in a variety of applications including, material processing, medical therapeutic applications, instrumentation, research, telecommunications, optical storage, entertainment, image recording, inspection, measurement and control, bar code scanning and sensing.

Additionally, the laser can be Q-switched or mode locked, used to generate harmonics or pump optical parametric oscillators. Changes and modifications in the specifically described embodiments can be carried out without departing from the scope of the invention which is intended to be limited only by the scope of the appended claims.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

We claim:

1. A diode pumped laser, comprising:

a resonator mirror and an output coupler defining a laser resonator with a resonator optical axis;

a strong thermal lens gain medium with a $TEM_{00}$ mode diameter and a dopant level of 0.01 to less than 0.5 percent, the strong thermal lens being mounted in the resonator along the resonator optical axis;

a diode pump source supplying a pump beam to the gain medium in the laser resonator and produce an output beam with a diameter larger than the $TEM_{00}$ mode diameter to reduce thermal birefringence; and a power source supplying power to the diode pump source.

2. The laser of claim 1, wherein the dopant level is 0.05 to less than 0.5 percent.

3. The laser of claim 1, wherein the dopant level is 0.1 to less than 0.05.

4. The laser of claim 1, further comprising:

a polarizing element positioned in the resonator.

5. The laser of claim 4, wherein the gain medium is $Nd:YVO_4$.

6. The laser of claim 1, wherein the laser has an optical slope efficiency in a $TEM_{00}$ mode of greater than about 40%.

7. The laser of claim 1, wherein the laser has an overall efficiency greater than about 25%.

8. The laser of claim 1, wherein a ratio of the $TEM_{00}$ mode diameter to the pump beam diameter in the gain medium is in the range of about less than 1.0 to 0.83.

9. The laser of claim 1, wherein the output beam has an $M^2$ of less than about 1.2.

10. The laser of claim 1, wherein the output beam has an $M^2$ of less than about 1.05.

11. The laser of claim 1, wherein the output beam is a diffraction limited gaussian beam.

12. The laser of claim 1, wherein the laser produces an output beam with a power of about 1 to 26 W.

13. The laser of claim 1, wherein the laser produces an output beam with a power greater than 26 W.

14. The laser of claim 1, further comprising:

a Q-switch positioned in the resonator.

15. The laser of claim 1, further comprising:

an aperture stop positioned in the resonator.

16. A diode pumped laser, comprising:

a resonator mirror and an output coupler defining a laser resonator with a resonator optical axis and a resonator length of 1 to 10 Rayleigh ranges;

a strong thermal lens gain medium with a $TEM_{00}$ mode diameter and a dopant level in the range of 0.01 to less than 0.5 percent, the strong thermal lens being mounted in the resonator along the resonator optical axis;

a diode pump source supplying a pump beam to the gain medium in the laser resonator and produce an output beam with a diameter larger than the $TEM_{00}$ mode diameter; and a power source supplying power to the diode pump source.

17. The laser of claim 16, wherein the dopant level is in the range of 0.05 to less than 0.5 percent.

18. The laser of claim 16, wherein the dopant level is in the range of 0.1 to less than 0.5 percent.

19. The laser of claim 16, wherein the resonator has a length of 2 to 4 Rayleigh ranges.

20. The laser of claim 16, further comprising:

a polarizing element positioned in the resonator.

21. The laser of claim 16, wherein the the gain medium is $Nd:YVO_4$.

22. The laser of claim 16, wherein the laser has an optical slope efficiency in a $TEM_{00}$ mode of greater than about 40%.

23. The laser of claim 16, wherein the laser has an overall efficiency greater than about 25%.

24. The laser of claim 16, wherein a ratio of the $TEM_{00}$ mode diameter to the pump beam diameter in the gain medium is in the range of about less than 1.0 to 0.83.

25. The laser of claim 16, wherein the output beam has an $M^2$ of less than about 1.2.

26. The laser of claim 16, wherein the output beam has an $M^2$ of less than about 1.05.

27. The laser of claim 16, wherein the output beam is a diffraction limited gaussian beam.

28. The laser of claim 16, wherein the laser produces an output beam with a power of about 1 to 26 W.

29. The laser of claim 16, wherein the laser produces an output beam with a power greater than 26 W.

30. The laser of claim 16, further comprising:

a Q-switch positioned in the resonator.

31. The laser of claim 16, further comprising:

an aperture stop positioned in the resonator.

32. A diode pumped solid state laser, comprising:

a resonator mirror and an output coupler defining a laser resonator with a resonator optical axis;

a strong thermal lens gain medium with a $TEM_{00}$ mode diameter and soldered with an indium based solder to a high sink, the gain medium being positioned along the resonator optical axis and a dopant level in the range of 0.01 to less than 0.5 percent;

a diode pumped source supplying a pump beam to the gain medium in the laser resonator and produce an output beam creating a pump beam diameter in the gain medium greater than the $TEM_{00}$ mode diameter; and a power source supplying power to the diode pump source.

33. The laser of claim 32, wherein the dopant level is 0.05 to less than 0.5 percent.

34. The laser of claim 32, wherein the dopant level is 0.1 to less than 0.05 percent.

* * * * *